(12) United States Patent
Ladouceur et al.

(10) Patent No.: US 8,035,963 B2
(45) Date of Patent: Oct. 11, 2011

(54) MULTIPLE-FOLD PORTABLE ELECTRONIC DEVICE

(75) Inventors: Norman Ladouceur, Waterloo (CA); Jason Griffin, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 12/953,961

(22) Filed: Nov. 24, 2010

(65) Prior Publication Data

US 2011/0080702 A1    Apr. 7, 2011

Related U.S. Application Data

(63) Continuation of application No. 12/343,718, filed on Dec. 24, 2008, now Pat. No. 7,864,524.

(51) Int. Cl.
*G06F 1/16* (2006.01)
(52) U.S. Cl. .................. 361/679.55; 455/575.4
(58) Field of Classification Search .................. None
See application file for complete search history.

(56) References Cited

U.S. PATENT DOCUMENTS

| | | | | |
|---|---|---|---|---|
| 4,839,837 A * | 6/1989 | Chang | ...................... | 361/679.09 |
| 5,278,779 A * | 1/1994 | Conway et al. | .......... | 361/679.16 |
| 5,808,862 A * | 9/1998 | Robbins | .................. | 361/679.09 |
| 5,926,364 A * | 7/1999 | Karidis | ..................... | 361/679.27 |
| 6,023,410 A * | 2/2000 | Chu et al. | ................. | 361/679.46 |
| 6,256,192 B1 * | 7/2001 | Shannon | ................... | 361/679.06 |
| 6,392,871 B1 * | 5/2002 | Yanase | ..................... | 361/679.07 |
| 6,628,508 B2 * | 9/2003 | Lieu et al. | ................. | 361/679.09 |
| 6,989,984 B2 * | 1/2006 | Sutton et al. | ............. | 361/679.16 |
| 7,031,143 B2 * | 4/2006 | Madsen et al. | ............. | 361/679.2 |
| 7,061,472 B1 * | 6/2006 | Schweizer et al. | ............ | 345/168 |
| 7,110,797 B2 * | 9/2006 | Soejima | ..................... | 455/575.1 |
| 7,136,282 B1 * | 11/2006 | Rebeske | .................. | 361/679.55 |
| 7,352,565 B2 * | 4/2008 | Yin | .......................... | 361/679.55 |
| 7,511,950 B1 * | 3/2009 | Brekke et al. | ............. | 361/679.55 |
| D597,055 S * | 7/2009 | Ladouceur et al. | .... | D14/138 AB |
| 7,864,524 B2 * | 1/2011 | Ladouceur et al. | ...... | 361/679.55 |
| 7,869,843 B2 * | 1/2011 | Ladouceur et al. | ...... | 455/575.3 |
| 2004/0160736 A1 * | 8/2004 | Lin | .............................. | 361/683 |
| 2005/0057891 A1 * | 3/2005 | Madsen et al. | ................ | 361/680 |
| 2006/0034601 A1 | 2/2006 | Andersson et al. | | |
| 2006/0126284 A1 * | 6/2006 | Moscovitch | .................. | 361/681 |
| 2008/0062625 A1 * | 3/2008 | Batio | ............................ | 361/680 |
| 2009/0086424 A1 * | 4/2009 | Jette | ........................ | 361/679.55 |
| 2009/0186662 A1 * | 7/2009 | Rak et al. | ....................... | 455/566 |
| 2010/0061054 A1 * | 3/2010 | Ladouceur et al. | ...... | 361/679.56 |
| 2010/0157518 A1 * | 6/2010 | Ladouceur et al. | ...... | 361/679.09 |
| 2011/0009174 A1 * | 1/2011 | Ladouceur et al. | ........ | 455/575.3 |

FOREIGN PATENT DOCUMENTS

EP    2202949 A1 *   6/2010

OTHER PUBLICATIONS

European Patent Application No. 08172932.9 Examination Report dated Dec. 20, 2010.

* cited by examiner

*Primary Examiner* — Lisa Lea Edmonds
(74) *Attorney, Agent, or Firm* — Perry + Currier, Inc.

(57) ABSTRACT

A multiple-fold portable electronic device is provided. The portable electronic device in one embodiment includes a first, second and third planar sections. The first and second planar sections are connected by a first joint and foldable in relation to each other. The second and third planar sections are connected by a second joint and foldable in relation to each other. Each planar section can include an input device or an output device or both.

20 Claims, 15 Drawing Sheets

MULTIPLE-FOLD PORTABLE ELECTRONIC DEVICE

CROSS-REFERENCE TO RELATED APPLICATION

This is a continuation of U.S. patent application Ser. No. 12/343,718 filed Dec. 24, 2008, the contents of which are incorporated herein by reference. Application Ser. No. 12/343,718 has been allowed but a Patent No. is not yet available.

FIELD

This specification relates to portable electronic devices and more particularly relates to a multiple-fold portable electronic device.

BACKGROUND

Portable electronic devices are ubiquitous because their applications are seemingly limitless. Some examples of portable electronic devices are cell phones, smartphones, email paging devices, Personal Digital Assistants (PDA), audio players, video players, video cameras, still cameras, and portable video games. Increasingly, the functionalities of foregoing are being incorporated into single multi-function electronic devices. One challenge in designing a multi-function electronic device is to increase the operable surface used for input and output devices, such as display screens, keyboards, trackwheels, cameras, and touch screens. Yet, in maximizing the operable surface, care is also needed to reduce the volume of the device so as to maintain portability. A popular solution is a flip device that pivotally attaches a screen to a keyboard. In use, the flip device is flipped open to expose the screen and the keyboard. In storage, the device is closed like a clam with the screen facing the keyboard. However, as the functionalities of multi-function devices increase, flip devices can prove limiting.

DESCRIPTION OF PREFERRED EMBODIMENTS

Figure 1:
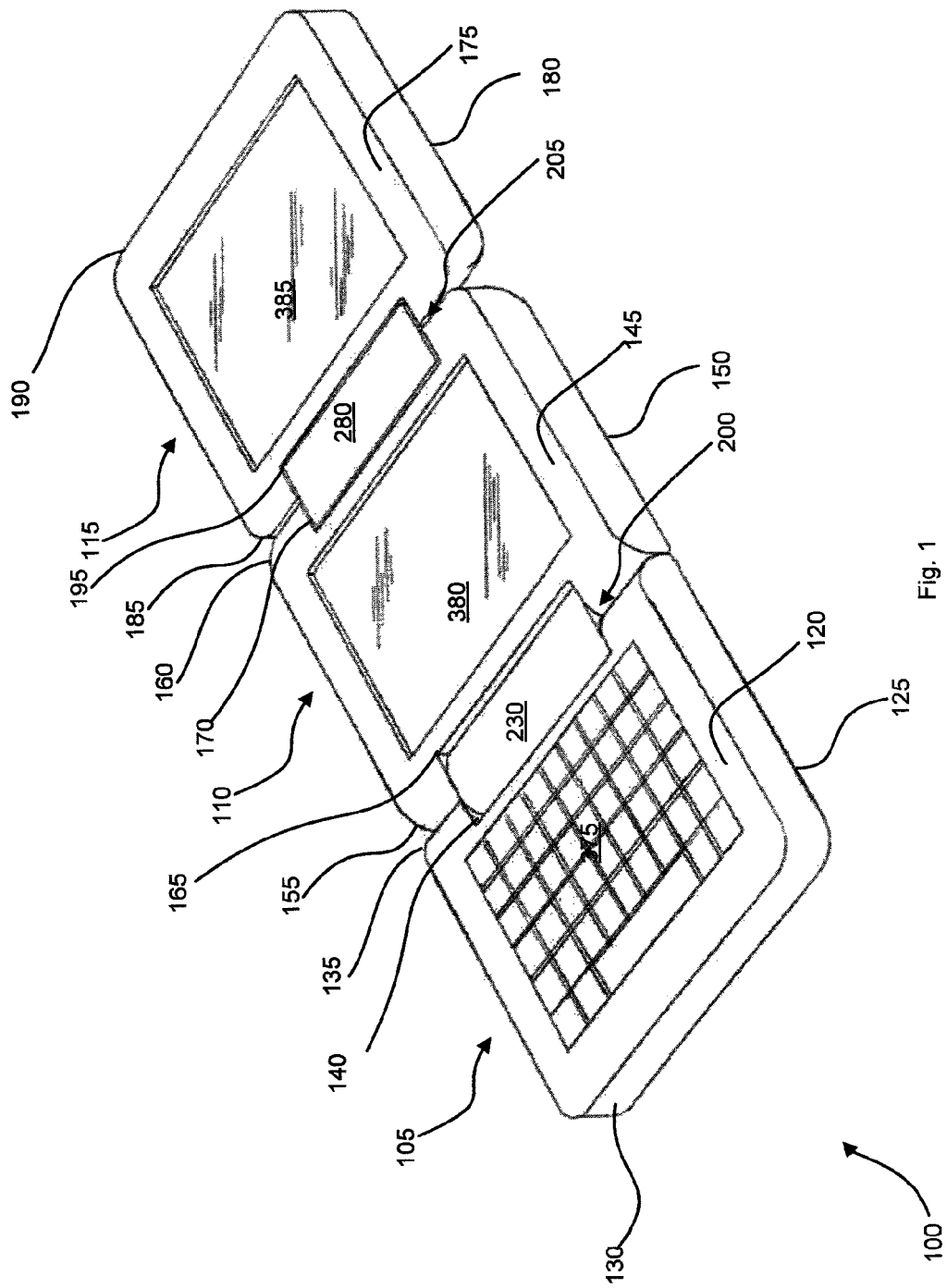
FIG. 1 is a perspective view of a double-fold portable electronic device in an open position.

Referring to FIGS. 1, 2, 3, and 4, a double-fold portable electronic device in accordance with a first embodiment is generally indicated at 100. Double-fold portable electronic device 100 has an open position (shown in FIG. 1) and a shut position (shown in FIGS. 3 and 4). Double-fold portable electronic device 100 has a first planar housing 105, a second planar housing 110, and a third planar housing 115. Each planar housing 105, 110, 115 is a hexahedron. First planar housing 105 has a first surface 120, a second surface 125, a first side 130, a second side 135, and a first recess 140 situated in second side 135. Second planar housing 110 has a third surface 145, a fourth surface 150, a third side 155, a fourth side 160, a second recess 165 situated in third side 155, and a third recess 170 situated in fourth side 160. Third planar housing 115 has a fifth surface 175, a sixth surface 180, a fifth side 185, a sixth side 190, and a fourth recess 195 situated in fifth side 185. First planar housing 105 is connected to second planar housing 110 via a first joint 200. First joint 200 is situated in the first recess 140 and second recess 165. Second planar housing 110 is connected to third planar housing 115 via a second joint 205.

Figure 2:
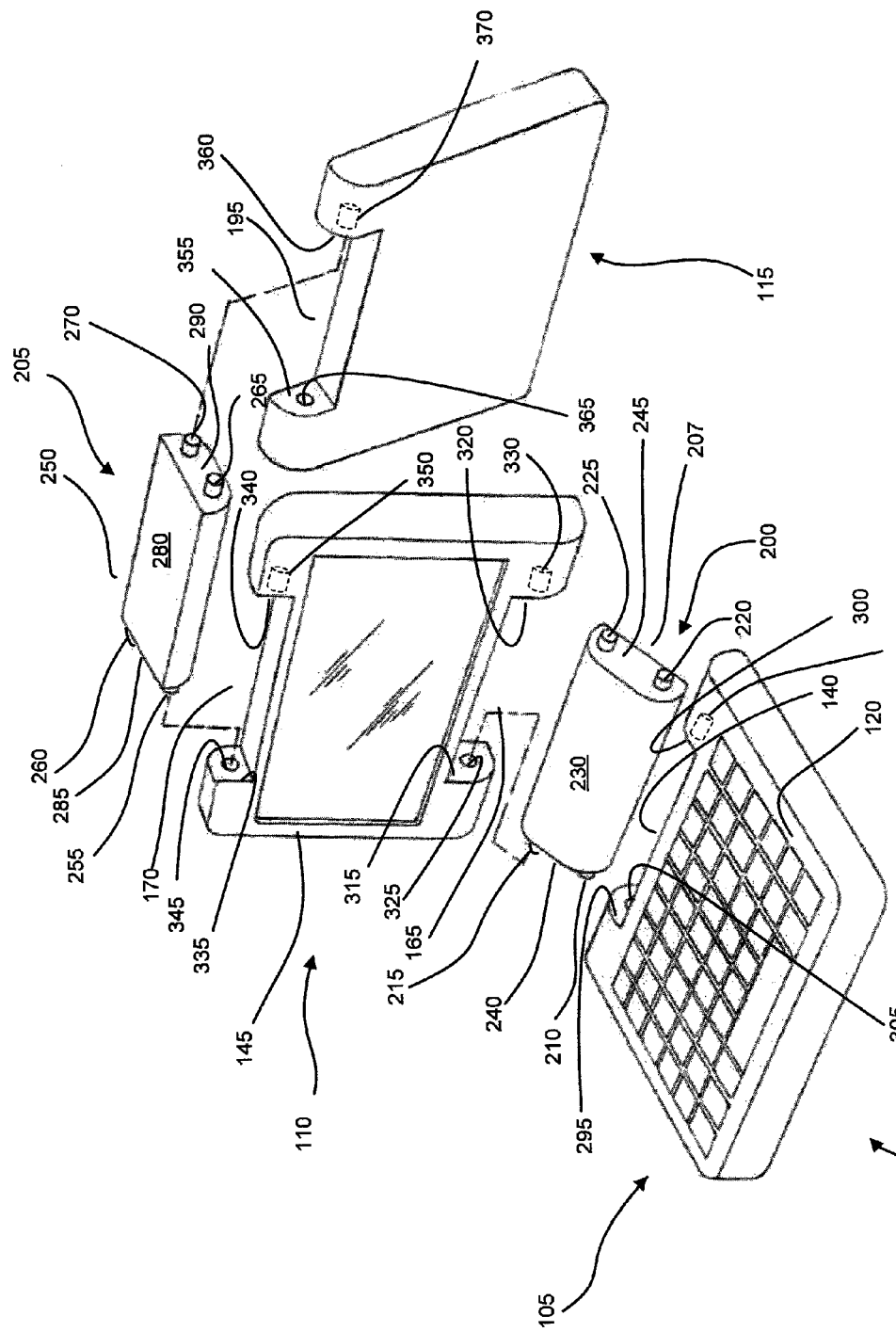
FIG. 2 is a perspective view of the double-fold portable electronic device of FIG. 1 in a disassembled state.

Referring to FIG. 2, to illustrate joints 200, 205 and their connections to housings 105, 110, 115 in more detail, double-fold portable electronic device 100 is shown with housings 105, 110, 115 detached from joints 200, 205. First joint 200 comprises a first body 207, a first hinge 210, a second hinge 215, a third hinge 220, and a fourth hinge 225. First body 207 has a lateral cross-section of an elongated C formed by a first rounded side 230 and a first flat side 235 (best seen in FIG. 3). First body 207 comprises a first end 240 and a second end 245. First hinge 210 and second hinge 215 extend from first end 240. Third hinge 220 and fourth hinge 225 extend from second end 245. Second joint 205 comprises a second body 250, a fifth hinge 255, a sixth hinge 260, a seventh hinge 265, and a eighth hinge 270. Second body 250 has a lateral cross-section of an elongated C formed by a second rounded side 275 (best seen in FIG. 4) and a second flat side 280. Second body 250 comprises a third end 285 and fourth end 290. Fifth hinge 255 and sixth hinge 260 extend from third end 285. Seventh hinge 265 and eighth hinge 270 extend from fourth end 290.

First recess 140 has a first wall 295 and a second wall 300. First wall 295 comprises a first pivot 305. Second wall 300 comprises a second pivot 310. Second recess 165 comprises a third wall 315 and a fourth wall 320. Third wall 315 comprises a third pivot 325. Fourth wall 320 comprises a fourth pivot 330. Third recess 170 comprises a fifth wall 335 and a sixth wall 340. Fifth wall 335 comprises a fifth pivot 345. Sixth wall 340 comprises a sixth pivot 350. Fourth recess 195 comprises a seventh wall 355 and eighth wall 360. Seventh wall 355 comprises a seventh pivot 365. Eighth wall 360 comprises an eighth pivot 370.

First joint 200 is attached to first planar housing 105 via the mating of first hinge 210 with first pivot 305 and third hinge 220 with second pivot 310. First joint 200 is attached to second planar housing 110 via the mating of second hinge 215 with third pivot 325 and fourth hinge 225 with fourth pivot 330. Second joint 205 is attached to second planar housing 110 via the mating of fifth hinge 255 with fifth pivot 345 and seventh hinge 265 with sixth pivot 350. Second joint 205 is attached to third planar housing 115 via the mating of sixth hinge 260 with seventh pivot 365 and eighth hinge 270 with eighth pivot 370.

In the present embodiment, in the open position, first surface 120, first rounded side 230, third surface 145, second flat side 280, and fifth surface 175 all face the same general direction (shown in FIG. 1). In the present embodiment, in the shut position, first surface 120 is facing third surface 145, fourth surface 150 is facing sixth surface 180 and double-fold portable electronic device 100 forms a hexahedron that is substantially three times the height of each housing 105, 110, 115 (shown FIG. 3).

Figure 3:
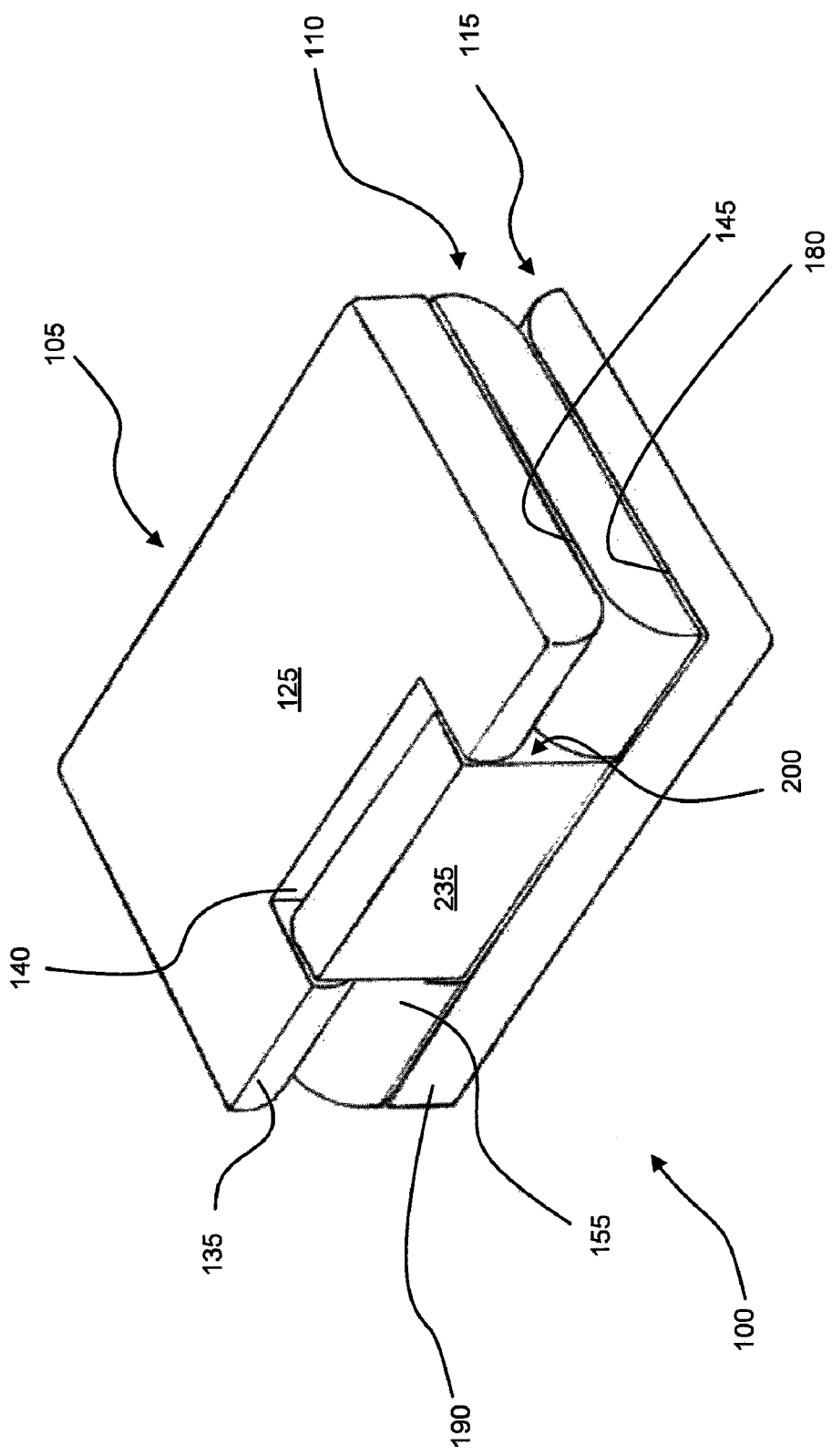
FIG. 3 is a perspective view of the double-fold portable electronic device of FIG. 1 in a shut position.
Figure 4:
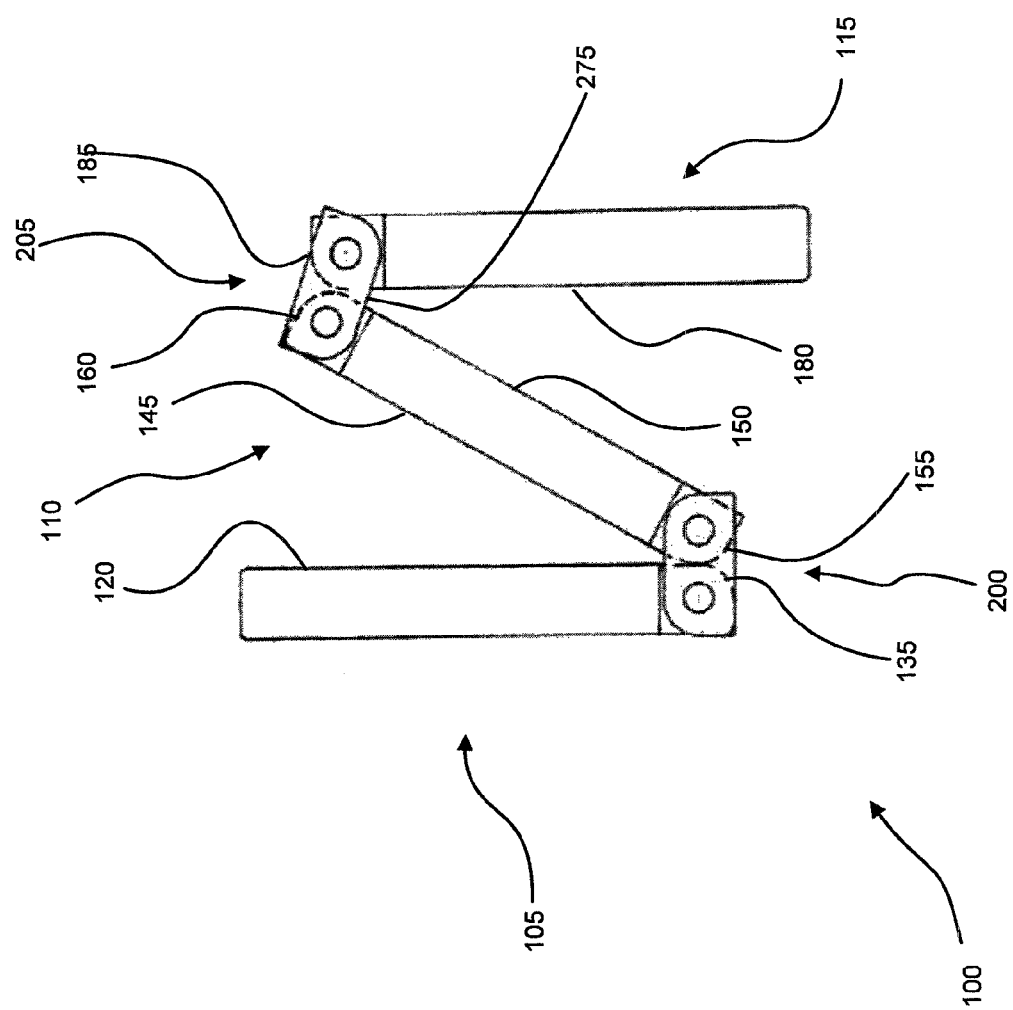
FIG. 4 is a side view of the double-fold portable electronic device of FIG. 1 transitioning between the open and shut positions.

Referring to FIG. 4, double-fold portable electronic device 100 is shown, in a side view, as it transitions between the open position (as shown in FIG. 1) and shut position (as shown in FIG. 3). In the present embodiment, second side 135, third side 155, fourth side 160, and fifth side 185 are rounded. Transitioning from the open position (shown in FIG. 1) to the shut position (shown in FIG. 3) can be effected by folding housings 105, 110, 115 onto each other. First planar housing 105 and second planar housing 110 are folded towards each other in the direction that decreases the radial distance between first surface 120 and third surface 145. Second planar housing 110 and third planar housing 115 are folded towards each other in the direction that decreases the radial distance between fourth surface 150 and sixth surface 180.

Transitioning from the shut position (shown in FIG. 3) to the open position (shown in FIG. 1) can be effected by unfolding housings 105, 110, 115 away from the housing that they are attached to by joints 200, 205. First planar housing 105 and second planar housing 110 are unfolded away from each other in the direction that increases the radial distance between first surface 120 and third surface 145. Second planar housing 110 and third planar housing 115 are unfolded away from each other in the direction that increases the radial distance between fourth surface 150 and sixth surface 180. As can be seen from FIG. 4, the rounding of second side 135, third side 155, fourth side 160, and fifth side 185 reduces the friction between the sides when the folding or unfolding occurs.

Figure 5:
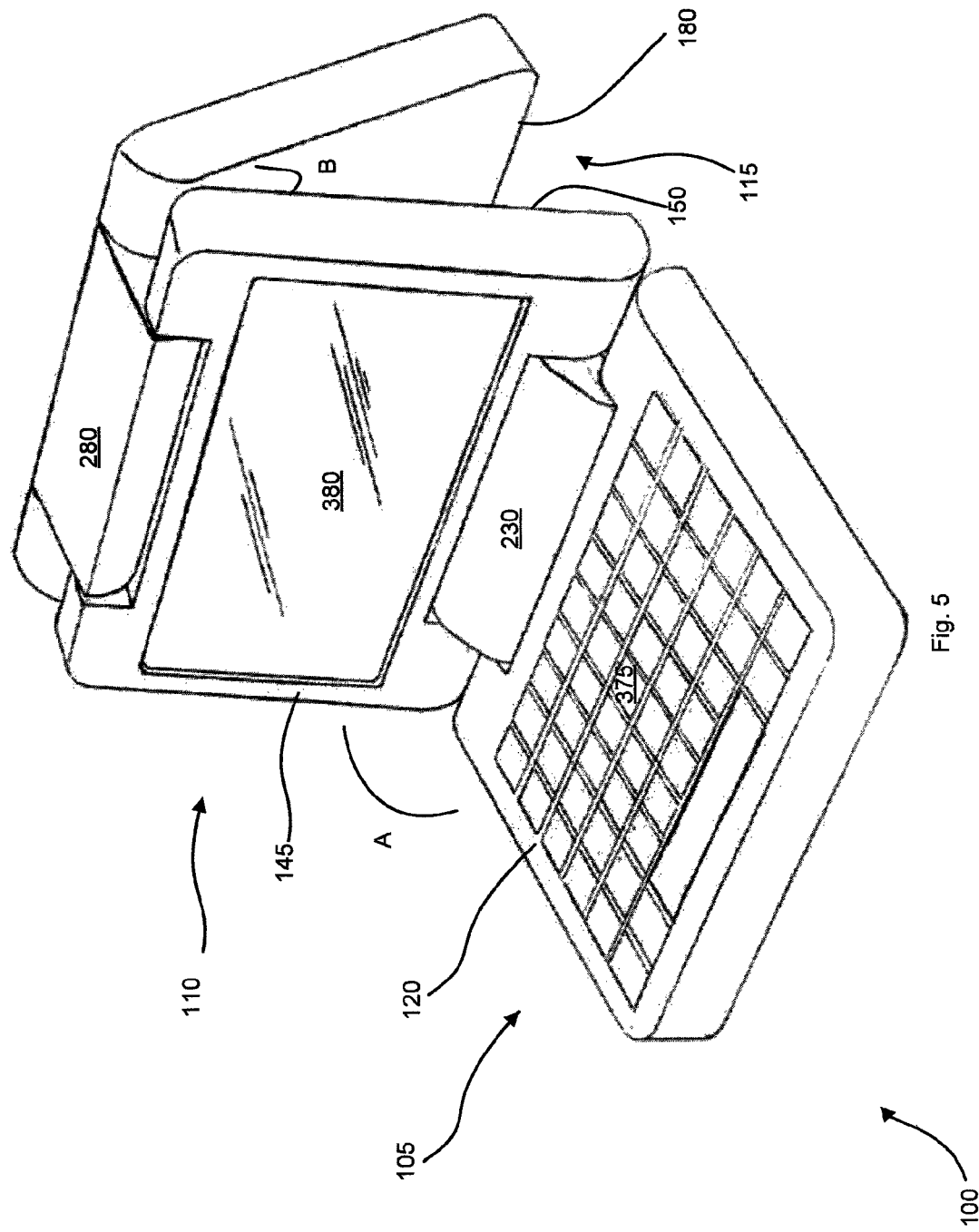
FIG. 5 is a perspective view of the double-fold portable electronic device of FIG. 1 in an intermediate position.

Referring to FIG. 5, double-fold portable electronic device 100 is shown in an exemplary intermediate position. First surface 120 and third surface 145 form an obtuse angle A. Fourth surface 150 and sixth surface 180 form an acute angle B. In the present embodiment, first surface 120 contains a keyboard 375, third surface 145 contains a first display screen 380, and fifth surface 175 contains a second display screen 385 (best seen in FIG. 1). It is apparent to a person skilled in the art that depending on the function the device, display screens 380, 385 can be touch screens.

Figure 6:
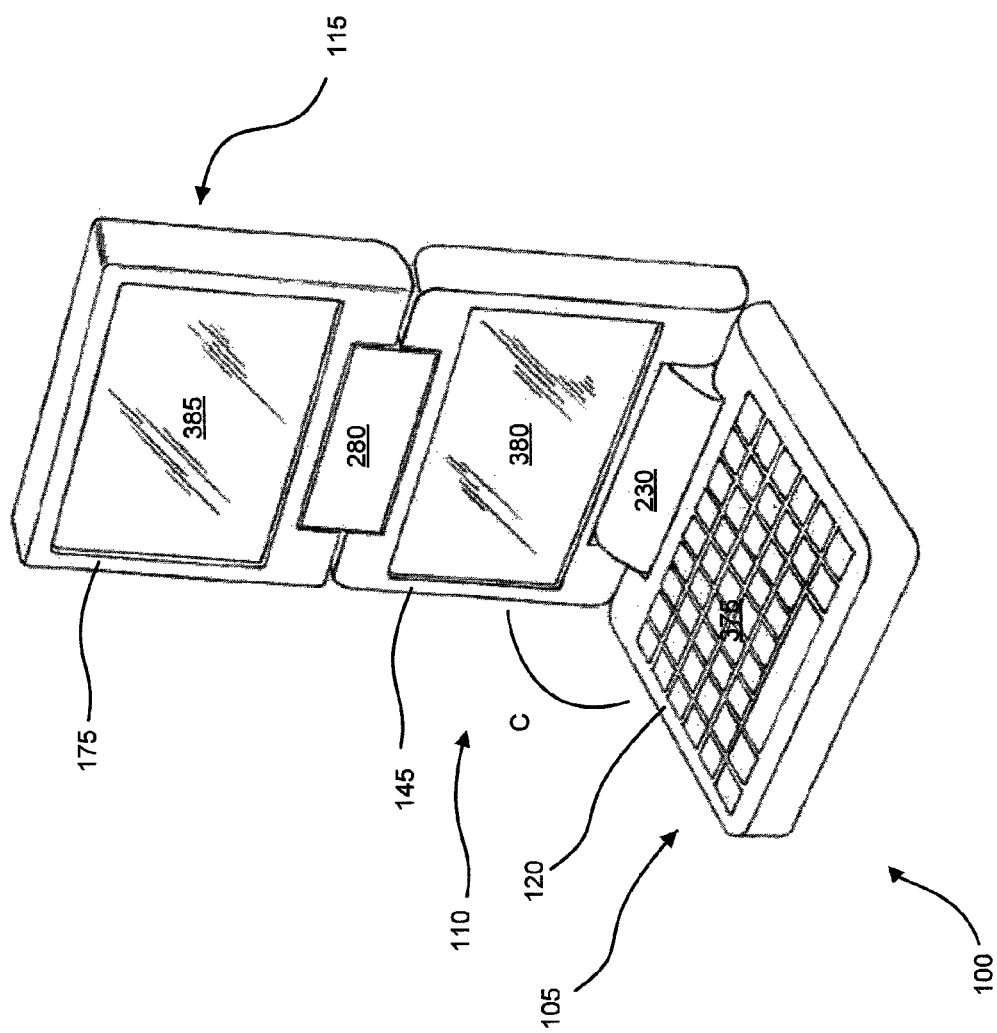
FIG. 6 is a perspective view of the double-fold portable electronic device of FIG. 1 in another intermediate position.

Referring to FIG. 6, double-fold portable electronic device 100 is shown in another exemplary intermediate position. First surface 120 and third surface 145 form an obtuse angle C. Third surface 145 and fifth surface 175 are facing the same direction.

Figure 7:
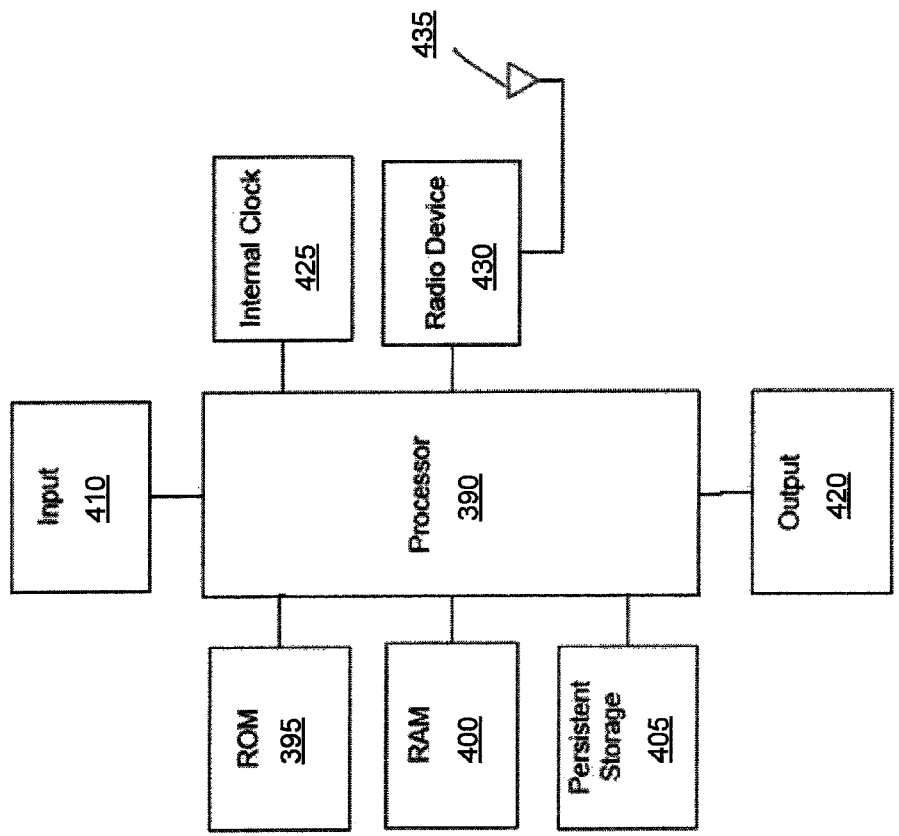
FIG. 7 is a block diagram of certain internal components within the electronic device of FIG. 1.

Referring to FIG. 7, certain internal components within double-fold portable electronic device 100 are illustrated by way of a block diagram. Double-fold portable electronic device 100 is based on a microcomputer that includes a processor 390 connected to a read-only-memory (ROM) 395 that contains a plurality of applications executable by processor 390 to enable double-fold portable electronic device 100 to provide certain services (e.g. calendar, e-mail, phone, etc.). Processor 390 is also connected to a random access memory (RAM) 400 and a persistent storage device 405, which is responsible for various non-volatile storage functions of double-fold portable electronic device 100. Processor 390 receives input from input devices 410 such as keyboard 375 (shown in FIG. 1), display screens 380, 385 (if they are touch screens), trackwheel 415 (shown in FIG. 8), and webcam 419 (shown in FIG. 8). Processor 390 outputs to output devices 420 such as display screens 380, 385 (shown in FIG. 1). Processor 390 is also connected to an internal clock 425 and a radio device 430 which, in turn, is connected to an antenna 435. Together, the radio device 430 and the antenna 435 are used to communicate over a wireless network. Double-fold portable electronic device 100 is operable to receive and transmit communication signals containing data that is communicated to and from a communication system via the radio device 430 and the antenna 435.

Figure 9:
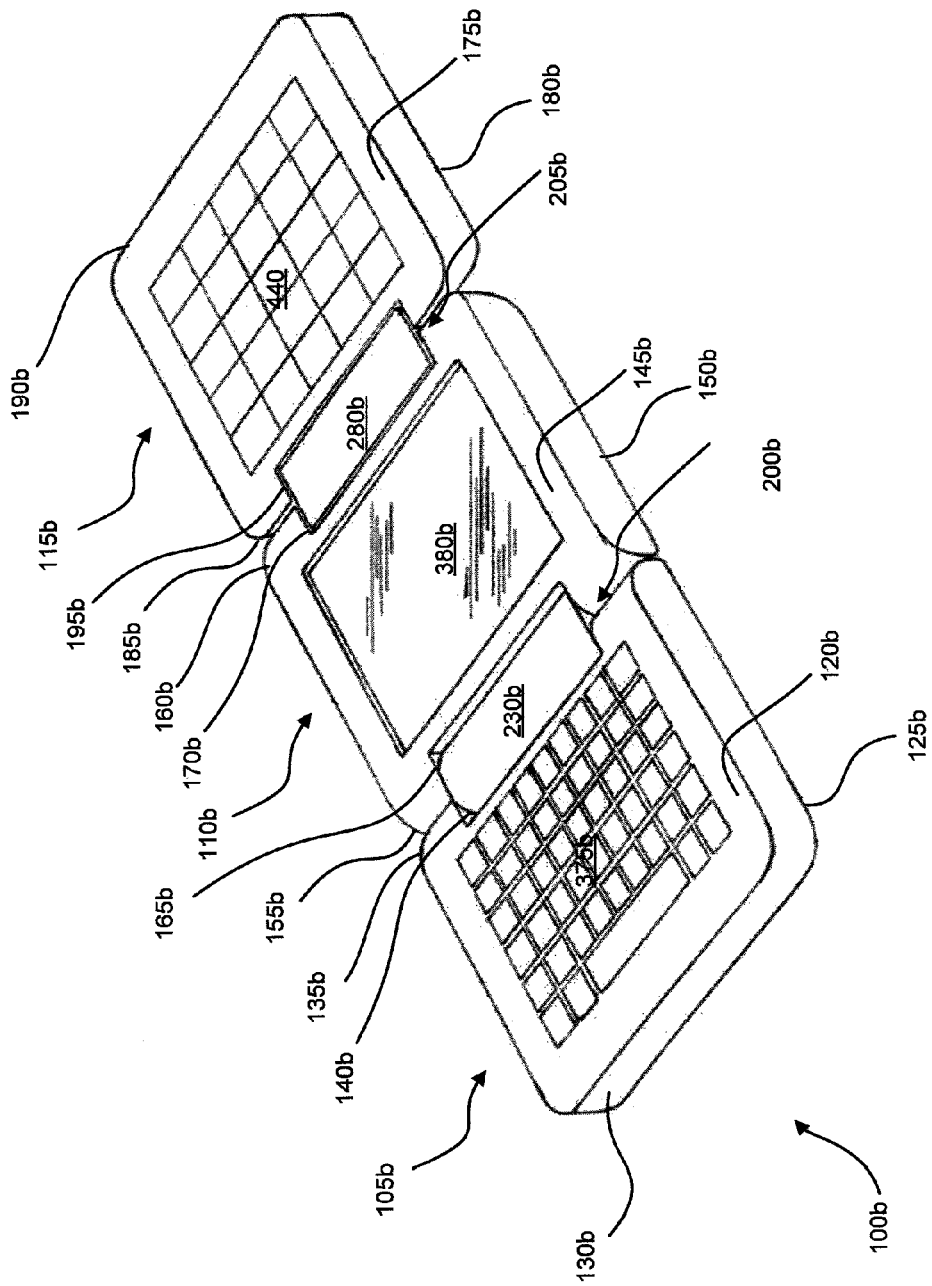
FIG. 9 is a perspective view of a further embodiment of a double-fold portable electronic device of FIG. 1.

Referring to FIGS. 1, 5, and 9 exemplary uses for double-fold portable electronic device 100 are shown. In FIG. 1, display screens 380, 385 can behave as an extended display screen (i.e., behave as one large screen) or as two separate display screens. For example, when processor 390 is running an application that requires a large display area, processor 390 can treat display screens 380, 385 as an extended display screen. One example application of double-fold portable electronic device 100 using display screens 380, 385 as two separate display screens is to have first display screen 380 display a map and have second display screen 385 display a zoomed in area of the map. Another example application of double-fold portable electronic device 100 using display screens 380, 385 as two separate display screens is to have first display screen 380 display thumbnails and have second display screen 385 display the file represented by a thumbnail that has been selected from first display screen 380. The arrangement of the display screens 380, 385 can automatically control the screens' behaviour. For example, transitioning from the open position (see FIG. 1) to the intermediate position shown in FIG. 5, can cause processor 390 to change the treatment of display screens 380, 385 from an extended display screen to two separate display screens or duplicate display screens (i.e., anything shown on one screen is correspondingly shown on the other screen). Likewise, transitioning from the intermediate position shown in FIG. 5 to the open position (see FIG. 1), can cause processor 390 to change the treatment of display screens 380, 385 from two separate display screens or duplicate display screens to an extended display screen. In FIG. 9, second display screen 385 behaves as a touchscreen keyboard 440. This can be used to play games or service any activity that requires input from more than one user. Touchscreen keyboard 440 may also be used as a touch phone keypad.

Figure 8:
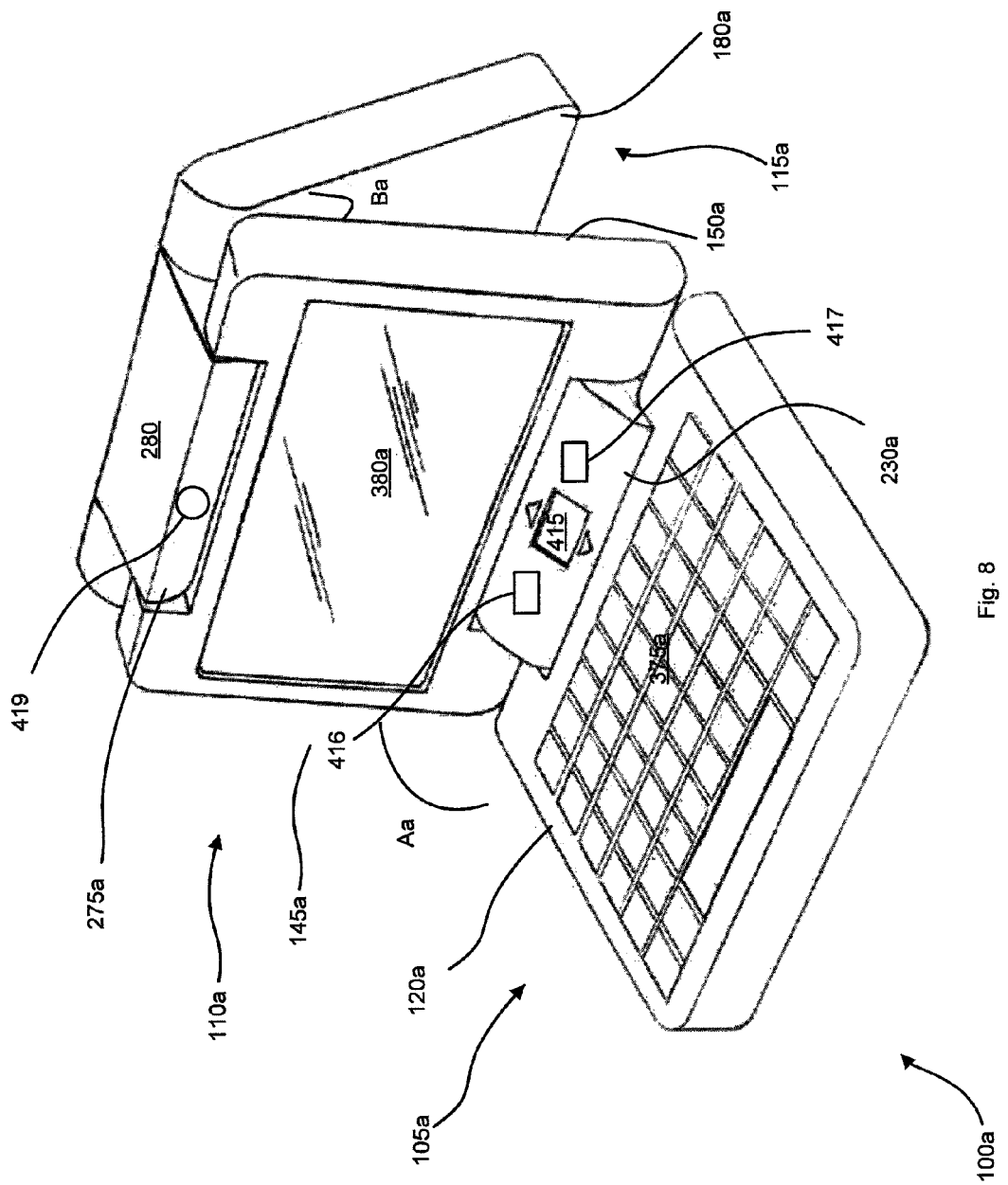
FIG. 8 is a perspective view of another embodiment of a double-fold portable electronic device of FIG. 1.

Referring to FIG. 8, a double-fold portable electronic device in accordance with another embodiment is indicated generally at 100a. Double-fold portable electronic device 100a is substantially the same as double-fold portable electronic device 100 and like elements of double-fold portable electronic device 100a bear the same reference characters, but followed by the suffix "a". However, unlike double-fold portable electronic device 100, double-fold portable electronic device 100a is shown in FIG. 8 displaying a trackwheel 415, a first button 416 and a second button 417 on either side of trackwheel 415, all three components embedded in first rounded side 230a, and a webcam 419 embedded in the side of second rounded side 275a. It is apparent to a person skilled in the art that trackwheel 415 can be other similar input devices such as a trackball, an optical jog ball, and a joy stick.

Referring to FIG. 9, a double-fold portable electronic device in accordance with yet another embodiment is indicated generally at 100b. Double-fold portable electronic device 100b is substantially the same as double-fold portable electronic device 100 and like elements of double-fold portable electronic device 100b bear the same reference characters, but followed by the suffix "b". However, unlike double-fold portable electronic device 100, double-fold portable electronic device 100b is shown in FIG. 9 displaying a touch-screen keyboard 440 on fifth surface 175b.

Figure 10:
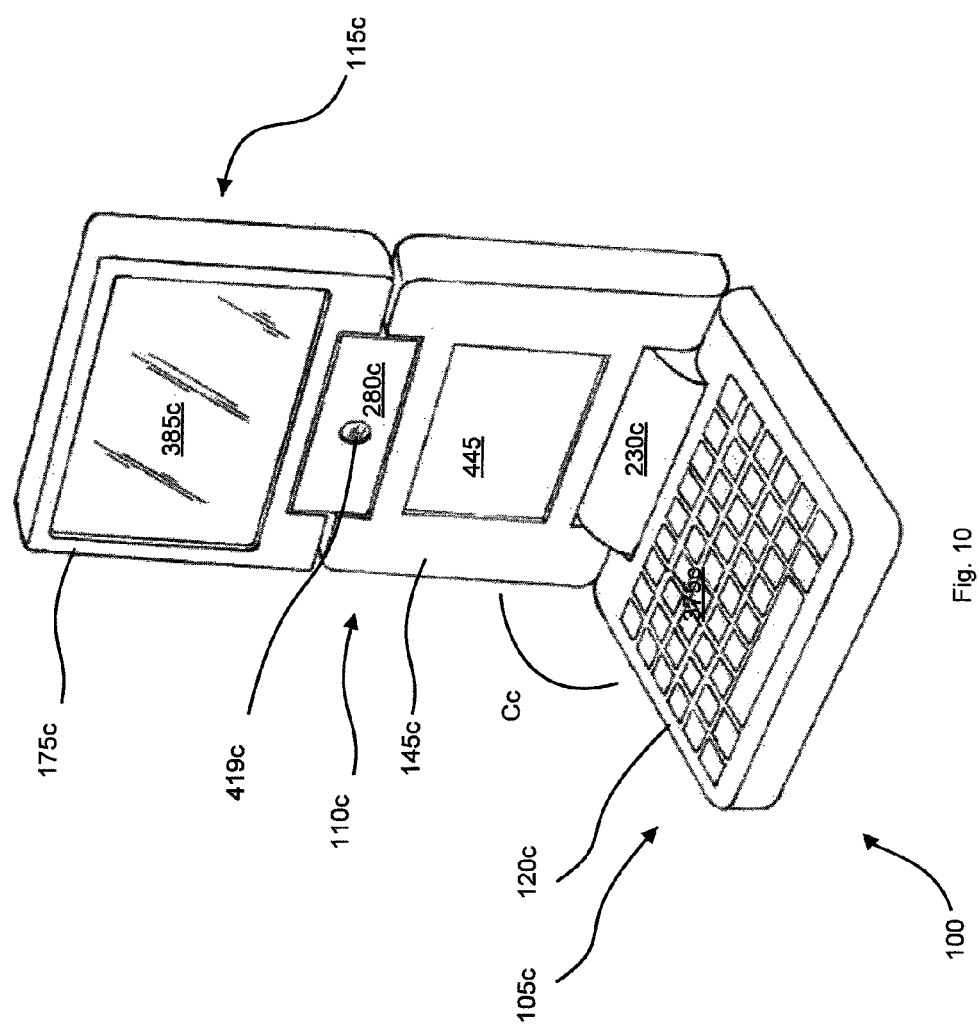
FIG. 10 is a perspective view of a further embodiment of a double-fold portable electronic device of FIG. 1.

Referring to FIG. 10, a double-fold portable electronic device in accordance with yet another embodiment is indicated generally at 100c. Double-fold portable electronic device 100c is substantially the same as double-fold portable electronic device 100 and like elements of double-fold portable electronic device 100c bear the same reference characters, but followed by the suffix "c". However, unlike double-fold portable electronic device 100, double-fold portable electronic device 100c is shown in FIG. 10 displaying a touchpad 445 on third surface 145c.

Figure 11:
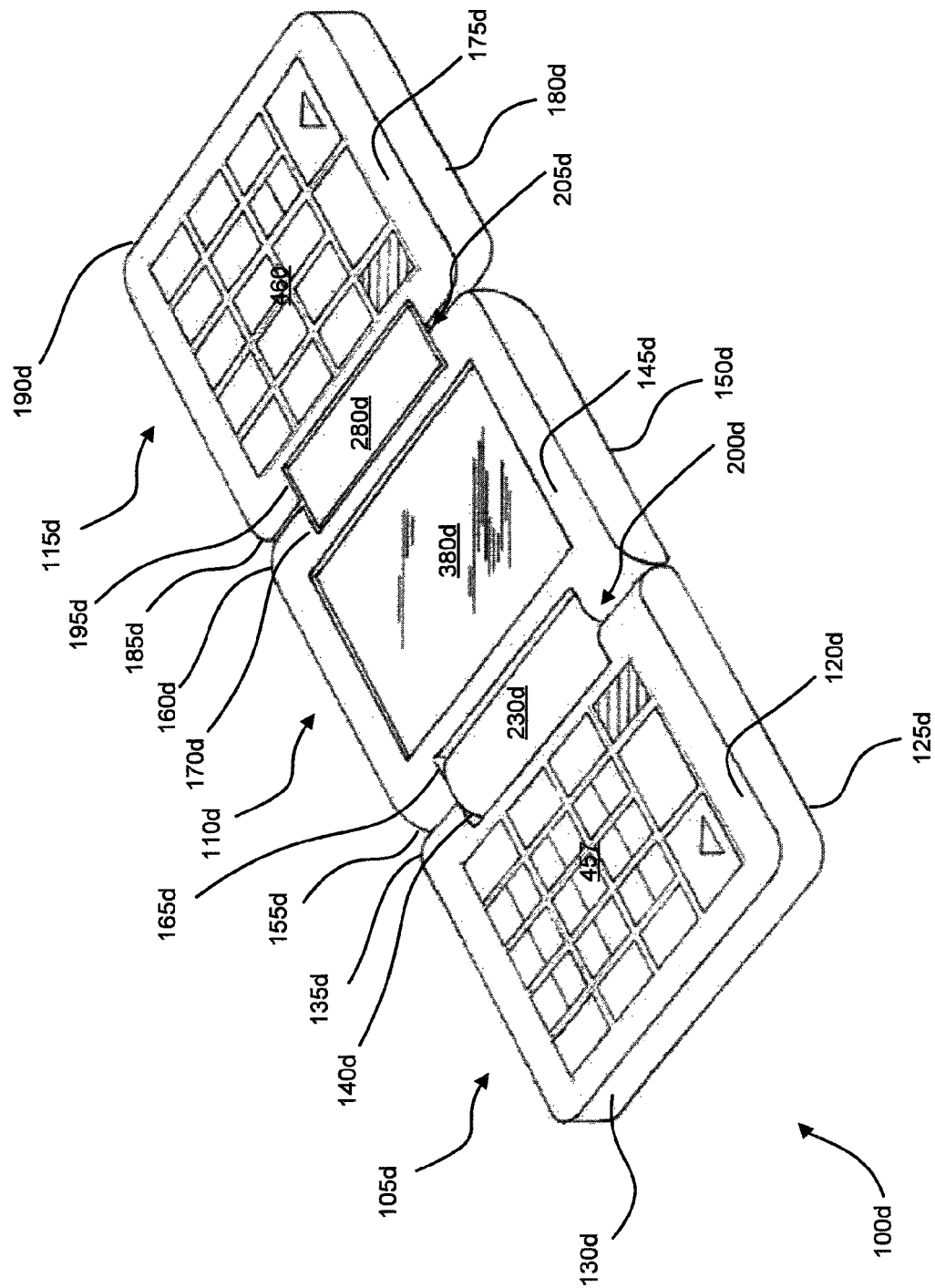
FIG. 11 is a perspective view of a further embodiment of a double-fold portable electronic device of FIG. 1.

Referring to FIG. 11, a double-fold portable electronic device in accordance with yet another embodiment is indicated generally at 100d. Double-fold portable electronic device 100d is substantially the same as double-fold portable electronic device 100 and like elements of double-fold portable electronic device 100d bear the same reference characters, but followed by the suffix "d". However, unlike double-fold portable electronic device 100, double-fold portable electronic device 100d is shown in FIG. 11 displaying a left half keyboard 457 on first surface 120d and a right half keyboard 460 on fifth surface 175d. Left half keyboard 457 contains the keys of the left half of a QWERTY keyboard and right half keyboard 460 contains the keys of the right half of a QWERTY keyboard.

Figure 12:
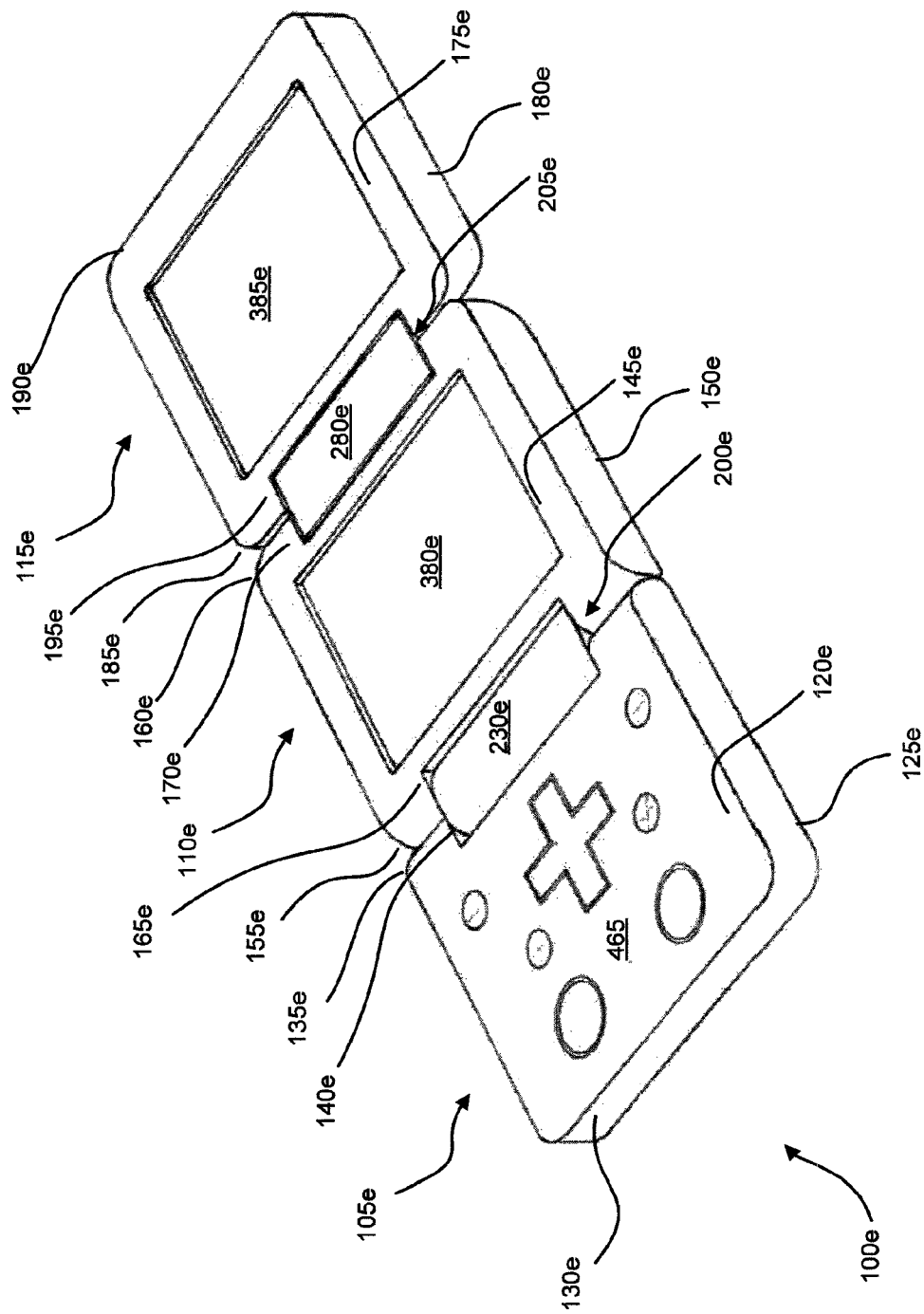
FIG. 12 is a perspective view of a further embodiment of a double-fold portable electronic device of FIG. 1.

Referring to FIG. 12, a double-fold portable electronic device in accordance with yet another embodiment is indicated generally at 100e. Double-fold portable electronic device 100e is substantially the same as double-fold portable electronic device 100 and like elements of double-fold portable electronic device 100e bear the same reference characters, but followed by the suffix "e". However, unlike double-fold portable electronic device 100, double-fold portable electronic device 100e is shown in FIG. 12 displaying a game control pad 465 on first surface 120e.

Figure 13:
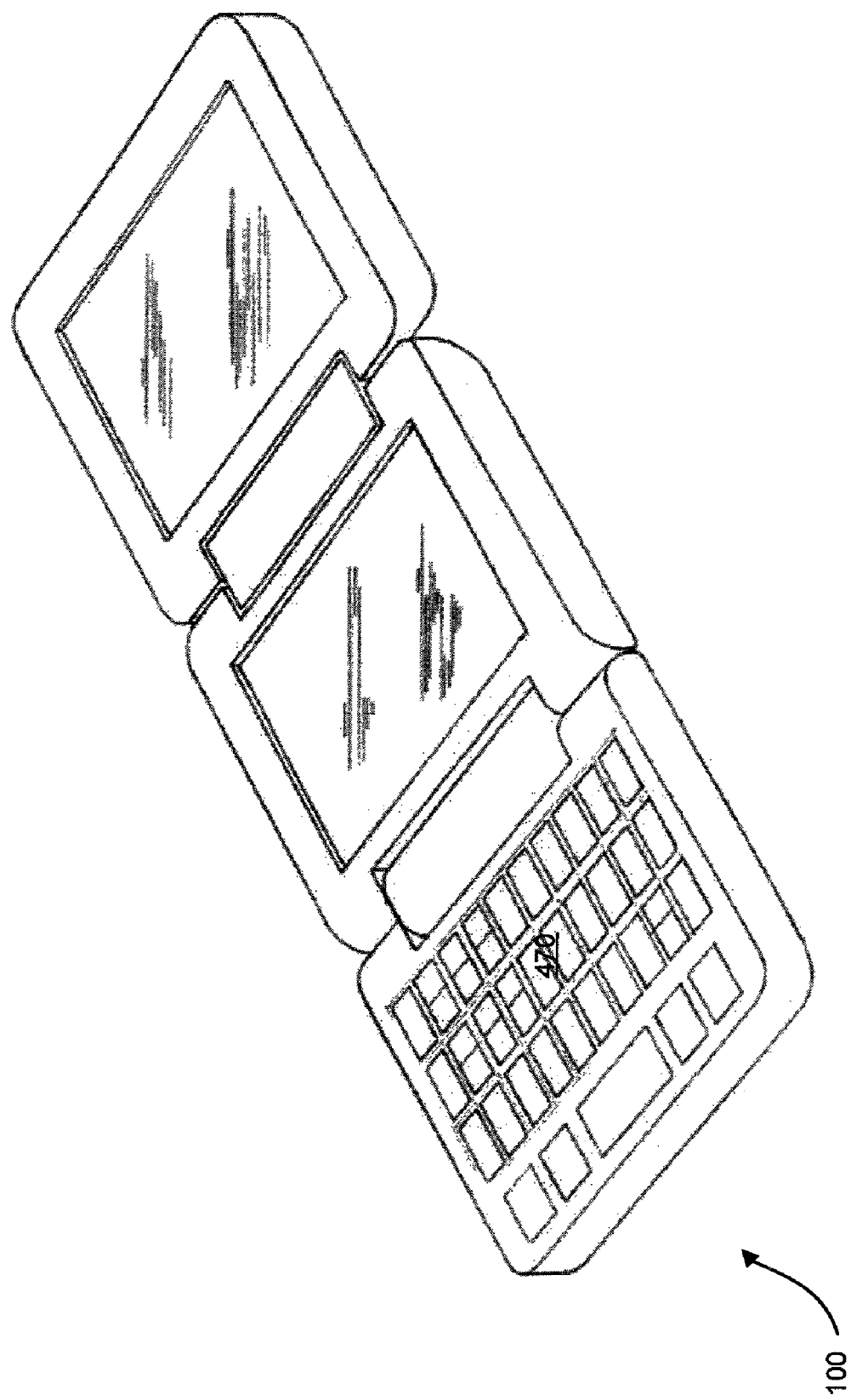
FIG. 13 is a perspective view of a further embodiment of a double-fold portable electronic device of FIG. 1.
Figure 14:
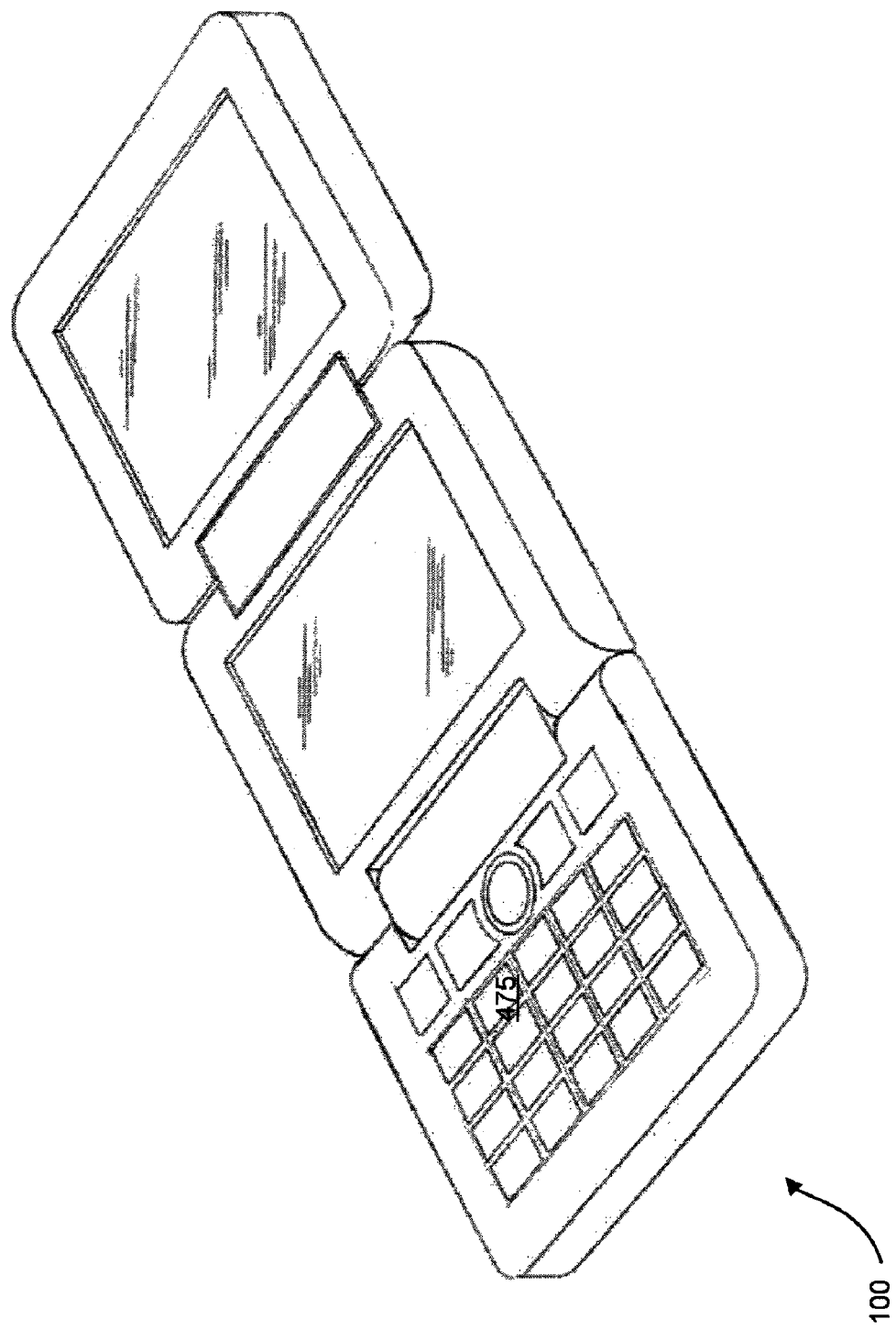
FIG. 14 is a perspective view of a further embodiment of a double-fold portable electronic device of FIG. 1.
Figure 15:
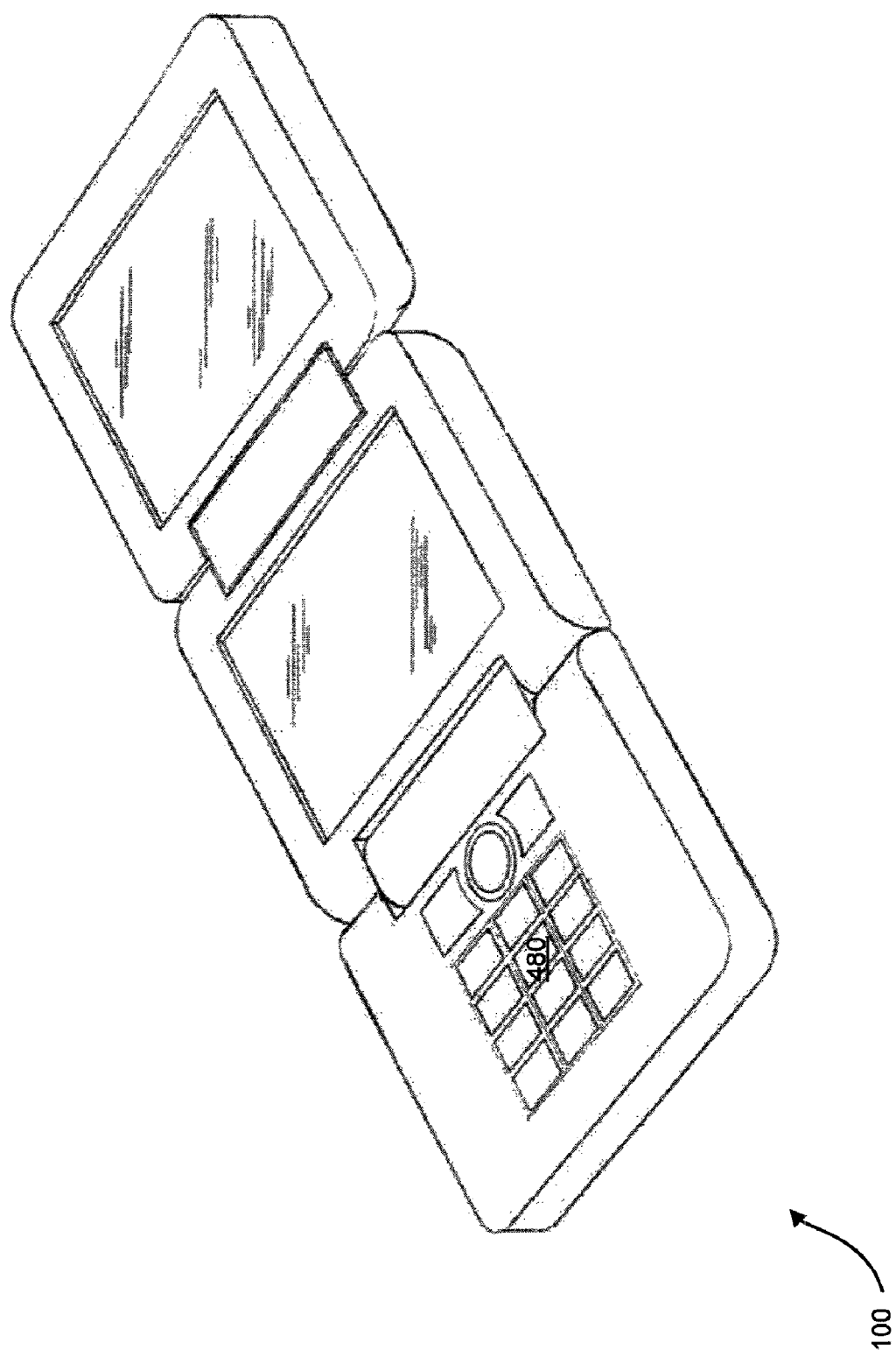
FIG. 15 is a perspective view of a further embodiment of a double-fold portable electronic device of FIG. 1.

While the embodiments discussed herein are directed to specific embodiments, it will be understood that subsets and variations of the embodiments are within the scope of the invention. For example, webcam 419 may be replaced by speakers. It is apparent to a person skilled in the art that keyboard 375, as drawn, is symbolic of a keyboard and that keyboard 375 may be a QWERTY keyboard 470 (see FIG. 13), a SURETYPE®keyboard 475 (see FIG. 14), telephone keyboard 480 (see FIG. 15), a QWERTZ keyboard, a QWERTU keyboard, a DVORAK, or other keyboards.

The invention claimed is:

1. A multiple-fold portable electronic device comprising:
a first planar housing including a first surface;
a second planar housing connected to said first planar housing via a first joint such that said first planar housing and said second planar housing are foldable in relation to each other between a shut position and an open position, said second planar housing including a third surface;
a third planar housing connected to said second planar housing via a second joint, said second planar housing and said third planar housing are foldable in relation to each other between the shut position and the open position, said third planar housing including a fifth surface, said first joint comprising a first rounded side and a first flat surface, said second joint comprising a second rounded side and a second flat side, said first rounded side comprising a first and second buttons,
wherein said first surface, third surface, fifth surface, first rounded side, and second flat side all face the same general direction when said portable electronic device is in said open position.

2. The portable electronic device of claim 1 wherein each of said housings is substantially the same size such that then when said electronic device is in said shut position and said open position said electronic device has the form factor of a hexahedron.

3. The portable electronic device of claim 1 wherein said second planar housing is pivotable in relation to said first housing via said first joint such that said first housing and said second housing are rotatable in relation to each other between at least a first parallel position and at least a first perpendicular position.

4. The portable electronic device of claim 1 wherein said third planar housing is pivotable in relation to said second planar housing via said second joint such that said second planar housing and said third planar housing are rotatable in relation to each other between at least a second parallel position and at least a second perpendicular position.

5. The portable electronic device of claim 1 wherein said first, second and third planar housings each include at least two sides, wherein said sides connected to said joints are rounded.

6. The portable electronic device of claim 1 wherein said first surface includes an input device.

7. The portable electronic device of claim 1 wherein said third surface includes a first display screen.

8. The portable electronic device of claim 7 wherein said first display screen is a touch screen.

9. The portable electronic device of claim 1 wherein said fifth surface includes a second display screen.

10. The portable electronic device of claim 9 wherein said second display screen is a touch screen.

11. A multiple-fold portable electronic device comprising:
a first planar housing including a first surface;
a second planar housing connected to said first planar housing via a first joint such that said first planar housing and said second planar housing are foldable in relation to each other between a shut position and an open position, said second planar housing including a third surface;
a third planar housing connected to said second planar housing via a second joint, said second planar housing and said third planar housing are foldable in relation to each other between the shut position and the open position, said third planar housing including a fifth surface, said first joint comprising a first rounded side and a first flat surface, said second joint comprising a second rounded side and a second flat side, said second rounded side comprising a webcam,
wherein said first surface, third surface, fifth surface, first rounded side, and second flat side all face the same general direction when said portable electronic device is in said open position.

12. The portable electronic device of claim 11 wherein each of said housings is substantially the same size such that then when said electronic device is in said shut position and said open position said electronic device has the form factor of a hexahedron.

13. The portable electronic device of claim 11 wherein said second planar housing is pivotable in relation to said first housing via said first joint such that said first housing and said second housing are rotatable in relation to each other between at least a first parallel position and at least a first perpendicular position.

14. The portable electronic device of claim 11 wherein said third planar housing is pivotable in relation to said second planar housing via said second joint such that said second planar housing and said third planar housing are rotatable in relation to each other between at least a second parallel position and at least a second perpendicular position.

15. The portable electronic device of claim 11 wherein said first, second and third planar housings each include at least two sides, wherein said sides connected to said joints are rounded.

16. The portable electronic device of claim 11 wherein said first surface includes an input device.

17. A multiple-fold portable electronic device comprising:
 a first planar housing comprising a first surface including a first input device;
 a second planar housing connected to said first planar housing via a first joint such that said first housing and said second housing are foldable in relation to each other between a shut position and an open position; and
 a third planar housing connected to said second planar housing via a second joint such that said second housing and said third planar housing are foldable in relation to each other between the shut position and the open position, said third planar housing comprising a fifth surface including a second input device,
 wherein said first input device is a left half of a QWERTY keyboard and said second input device is a right half of said QWERTY keyboard.

18. The portable electronic device of claim 17 wherein each of said housings is substantially the same size such that then when said electronic device is in said shut position and said open position said electronic device has the form factor of a hexahedron.

19. The portable electronic device of claim 17 wherein said second planar housing is pivotable in relation to said first housing via said first joint such that said first housing and said second housing are rotatable in relation to each other between at least a first parallel position and at least a first perpendicular position.

20. The portable electronic device of claim 17 wherein said third planar housing is pivotable in relation to said second planar housing via said second joint such that said second planar housing and said third planar housing are rotatable in relation to each other between at least a second parallel position and at least a second perpendicular position.

\* \* \* \* \*